(12) United States Patent
Crisp et al.

(10) Patent No.: US 12,522,747 B2
(45) Date of Patent: Jan. 13, 2026

(54) COATING COMPOSITIONS FOR USE IN CREPED PAPER PRODUCT MANUFACTURING AND METHODS FOR PRODUCING THE SAME

(71) Applicant: SOLENIS TECHNOLOGIES, L.P., Wilmington, DE (US)

(72) Inventors: Mark Tracey Crisp, Leusden (NL); Timothy Patterson, Wilmington, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 424 days.

(21) Appl. No.: 18/057,823

(22) Filed: Nov. 22, 2022

(65) Prior Publication Data

US 2023/0193076 A1    Jun. 22, 2023

Related U.S. Application Data

(60) Provisional application No. 63/265,843, filed on Dec. 22, 2021.

(51) Int. Cl.
*C09D 177/06* (2006.01)

(52) U.S. Cl.
CPC .................. *C09D 177/06* (2013.01)

(58) Field of Classification Search
USPC ........................................................ 528/340
See application file for complete search history.

(56) References Cited

U.S. PATENT DOCUMENTS

| | | | |
|---|---|---|---|
| 4,423,170 A * | 12/1983 | Waddill | C08G 59/10 528/111 |
| 4,440,898 A | 4/1984 | Pomplun et al. | |
| 4,501,640 A | 2/1985 | Soerens | |
| 4,528,316 A | 7/1985 | Soerens | |
| 4,684,439 A | 8/1987 | Soerens | |
| 4,788,243 A | 11/1988 | Soerens | |
| 5,179,150 A | 1/1993 | Furman, Jr. et al. | |
| 5,641,855 A | 6/1997 | Scherr et al. | |
| 5,660,687 A | 8/1997 | Allen et al. | |
| 5,833,806 A | 11/1998 | Allen et al. | |
| 5,902,862 A | 5/1999 | Allen | |
| 6,214,932 B1 | 4/2001 | Maslanka | |
| 7,943,705 B2 | 5/2011 | Allen | |
| 8,608,904 B1 | 12/2013 | Tucker et al. | |
| 9,945,076 B2 | 4/2018 | Choi et al. | |
| 2004/0110873 A1 | 6/2004 | Nagorny et al. | |
| 2007/0056706 A1 | 3/2007 | Crisp et al. | |
| 2010/0069671 A1 | 3/2010 | Buehring et al. | |
| 2018/0179427 A1 | 6/2018 | Ringold et al. | |

FOREIGN PATENT DOCUMENTS

| | | | |
|---|---|---|---|
| CN | 111440324 A | | 4/2022 |
| PT | 2691442 E | * | 6/2016 |
| WO | 2021158235 A1 | | 8/2022 |

OTHER PUBLICATIONS

PT2691442E machine translation (Year: 2016).*
Chebi, "Chebi:63052—Jeffamine ED-2001", Jan. 24, 2012; 3 pp.; retrieved from the Internet: <https://www.ebi.ac.uk/chebi/searchld.do?chebild=CHEBI:63052>.
ISA/US, International Search Report and Written Opinion issued in Int. Appl. No. PCT/US2022/081058 mailed Mar. 8, 2023.

* cited by examiner

*Primary Examiner* — Terressa Boykin
(74) *Attorney, Agent, or Firm* — Ingrassia Fisher & Lorenz LLP

(57) ABSTRACT

A method for preparing an adhesive resin for use in a coating composition for a crepe paper manufacturing process that includes the steps of reacting a polycarboxylic acid or a derivative of a polycarboxylic acid with a polyamine to form a polyamidoamine intermediate; reacting a polyetheramine with an epihalohydrin to form a polyetheramine-epihalohydrin intermediate and reacting the polyamidoamine intermediate with the polyetheramine-epihalohydrin intermediate to form a polyamidoamine polyetheramine-epihalohydrin resin.

15 Claims, 12 Drawing Sheets

100

102
REACTING A POLYCARBOXYLIC ACID OR A DERIVATIVE OF A POLYCARBOXYLIC ACID WITH A POLYAMINE TO FORM A POLYAMIDOAMINE

104
REACTING A POLYETHERAMINE WITH A EPIHALOHYDRIN TO FORM A POLYETHERAMINE-EPIHALOHYDRIN RESIN

106
USING THE REACTION PRODUCT OF THE POLYETHERAMINE AND THE EPIHALOHYDRIN AS TO POLYFUNCTIONAL CROSSLINKER TO REACT WITH THE POLYAMIDOAMINE TO PRODUCE A POLYAMIDOAMINE POLYETHERAMINE-EPIHALOHYDRIN RESIN

108
OPTIONALLY FURTHER REACTING THE POLYAMIDOAMINE POLYETHERAMINE-EPIHALOHYDRIN RESIN WITH A DIFUNCTIONAL CROSS-LINKER TO INCREASE THE VISCOSITY OF THE POLYAMIDOAMINE POLYETHERAMINE-EPIHALOHYDRIN RESIN

110
OPTIONALLY ADJUSTING THE PH OF THE POLYAMIDOAMINE POLYETHERAMINE-EPIHALOHYDRIN RESIN TO A VALUE OF FROM ABOUT 2.0 TO ABOUT 9.0

FIG. 1

COATING COMPOSITIONS FOR USE IN CREPED PAPER PRODUCT MANUFACTURING AND METHODS FOR PRODUCING THE SAME

CROSS-REFERENCE TO RELATED APPLICATION

This application claims the benefit of U.S. Provisional application No. 63/265,843, filed 22 Dec. 2021, the entire contents of which are hereby incorporated by reference.

TECHNICAL FIELD

The present disclosure generally relates to creped paper products and methods for manufacturing creped paper products. More particularly, the present disclosure relates to coating compositions for use in creped paper product manufacturing and methods for producing the same.

BACKGROUND

The manufacture of crepe paper, such as tissue or towel, involves the pressing of a fibrous web against the surface of a heated drying cylinder, often referred to as a Yankee dryer or Yankee cylinder. The moisture content of the fibrous web may vary from about 5% to about 80%, depending on whether any type of pre-drying, such as Through Air Drying (TAD), is performed on the web. Such pre-drying is typically accomplished after the "forming section" of the paper machine, where the fibrous web is first formed and consolidated, but prior to the fibrous web coming into contact with the surface of the Yankee dryer. As the fibrous web dries on the surface of the Yankee dryer, adhesion develops between the fibrous web and the surface of the Yankee dryer. When the fibrous web is dried to a sufficiently low moisture level, it is removed from the surface of the Yankee dryer by scraping-off with a doctor blade, the edge of which is in contact with the cylinder across the width of the Yankee dryer. This is known as the creping process or "creping."

The creping process generally involves a metal or ceramic tip doctor blade that is pressed against the surface of the rotating heated Yankee dryer. The fibrous web impacts against the edge of the doctor and is dislodged from the surface of the Yankee dryer. The action of creping causes the structure of the dry fibrous web to change as it impacts against the doctor blade. Specifically, creping acts to foreshorten and compact the sheet, creating a textured surface of ridges and thereby increasing the caliper of the sheet so as to create bulk. The creping process also results in the breakdown of bonds between fibers of the web, resulting in a loss of dry tensile strength and causing the sheet to be less stiff. For tissue and towel products, these changes in physical properties are perceived as improvements in the absorbency and softness of the product. However, the pressing action by the doctor blade against the surface of the Yankee dryer results in wearing of the tip of the blade and, in some instances, damage to the surface of the Yankee dryer itself. As the doctor blade wears, the aforementioned changes in sheet physical properties become less apparent and result in a perceived poor quality of the paper product.

In modern creping operations utilizing high speeds, the surface of the Yankee dryer is often coated with one or a plurality of chemicals that may include, for example, adhesive resins, release agents, modifiers, surfactants, and plasticizers. These coating chemicals act to reduce the rate of wear on the creping doctor blade and in turn protects the surface of the Yankee dryer. The coating chemicals also help in the adhesion of the fibrous web to the surface of the Yankee dryer. Improved adhesion aids in faster drying of the wet fibrous web by the heated Yankee dryer. Improved adhesion also aids in maintaining a good and consistent creping action when the dry web contacts the creping doctor blade, yielding the sheet properties as desired.

The coating chemicals are typically provided in the form of an aqueous composition that may be applied to the surface of the heated Yankee dryer utilizing a spraying boom prior to the contact of the fibrous web with the cylinder. Upon contact with the hot surface of the Yankee dryer, water in the droplets of the aqueous coating composition sprayed onto the surface of the Yankee dryer evaporates, and an adhesive coating layer is formed. The creping doctor blade is configured such that the tip of the blade is embedded just below the surface of the coating layer formed on the surface of the Yankee dryer. In the absence of a fibrous web, the creping doctor blade thus removes the upper part of the coating layer formed on the surface of the Yankee dryer.

During the creping process, the coating on the surface of the Yankee cylinder may, over time, become relatively harder and as such relatively less effective in accomplishing its aims with respect to protection of the surface of the Yankee dryer and reducing the rate of wear of the doctor blade enabling release of the dried fibrous web. The relatively harder coating material may be removed by the creping doctor blade and may appear as a particulate, granular, or dusty material, which is often referred to as "coating dust". As the coating layer on the surface of the Yankee dryer becomes relatively harder, the rate of wear of the tip of the creping doctor blade may increase. In some instances, this hardening of the coating layer may cause the creping doctor blade to vibrate in a manner that results in inconsistencies in the surface of the coating layer, often in the form of a series of bands in the coating layer referred to as "chatter-marks." These chatter marks may affect the adhesion of the fibrous web to the surface to the Yankee dryer, which in turn affects how well the fibrous web dries and its subsequent removal in the creping process. Furthermore, as the coating layer on the surface of the Yankee dryer becomes relatively harder, the tip of the creping doctor blade may move from its original position with respect to the coating layer and, as such, rather than remaining embedded within the coating layer, the doctor blade may become located at the interface between the coating layer and the fibrous web. At this location, the creping process is less effective for imparting the desired properties into the fibrous web as it is removed from the surface of the Yankee dryer.

In some creping operations a water-soluble polyvinylalcohol is used in the coating composition to provide a thicker coating layer. Such a coating layer can be removed from the surface of the Yankee dryer with a ribbon-like structure. This is considered to be softer coating layer and thus be less susceptible to hardening. When polyvinylalcohols are used as the only chemical coating agent, however, the adhesion provided by the coating layer may be less than required to provide the needed control over the creping process, thus resulting in sub-optimal physical properties of the removed fibrous web. To improve the adhesion of the coating layer, it has been found that the addition of a creping adhesive to the aqueous coating composition may result in an increase in adhesion. The addition of an adhesive, however, results in the coating composition being more susceptible to becoming relatively harder over time, thus causing the deleterious effects as noted above.

Accordingly, it would be desirable to provide improved coating compositions for use in Yankee dryer operations. The improved coating compositions would desirably provide a sufficient adhesive effect to the fibrous web such that upon removal from the dryer, the resulting paper product exhibits the desirable physical properties of surface texture, tensile strength, and bulk. Furthermore, the improved coating compositions would desirably avoid the tendency to become relatively harder over time in order to prevent wear on the doctor blade and/or reduction in the aforementioned desirable physical properties. Still further, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

The present disclosure relates to coating compositions for use in crepe paper product manufacturing and methods for producing the same.

In one exemplary embodiment, a method for preparing an adhesive resin for use in a coating composition for a crepe paper manufacturing process includes the step of reacting a polycarboxylic acid or a derivative of a polycarboxylic acid with a polyamine to form a polyamidoamine intermediate. A molar ratio of the polyamine to the polycarboxylic acid or the derivative of the carboxylic acid is from about 0.9:1 to about 1.6:1. The method further includes the step of reacting a polyetheramine with an epihalohydrin to form a polyetheramine-epihalohydrin intermediate. The molar ratio of the polyetheramine to the epihalohydrin is from 0.5:1 to about 4.0:1. Still further, the method includes the step of reacting the polyamidoamine intermediate with the polyetheramine-epihalohydrin intermediate to form a polyamidoamine polyetheramine-epihalohydrin resin. The dry weight ratio of the polyetheramine-epihalohydrin intermediate to the polyamidoamine is from about 0.07:1 to about 0.62:1. Optionally, the method may include a step of reacting the polyamidoamine polyetheramine-epihalohydrin resin with a difunctional cross-linker. A dry weight ratio of the difunctional crosslinker to the polyamidoamine polyetheramine-epihalohydrin resin is in the range from about 0.005:1 to about 0.2:1. Further optionally, the method may include a step of adjusting a pH of the polyamidoamine polyetheramine-epihalohydrin resin of with an acid to a value from about 2.0 to about 9.0.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWING

The present disclosure will hereinafter be described in conjunction with the following drawing figures, wherein like numerals denote like elements, and wherein:

FIG. 1 is a flow diagram illustrating a method for producing a coating composition for use in crepe paper product manufacturing in accordance with some embodiments of the present disclosure;

DETAILED DESCRIPTION

Figure 2:
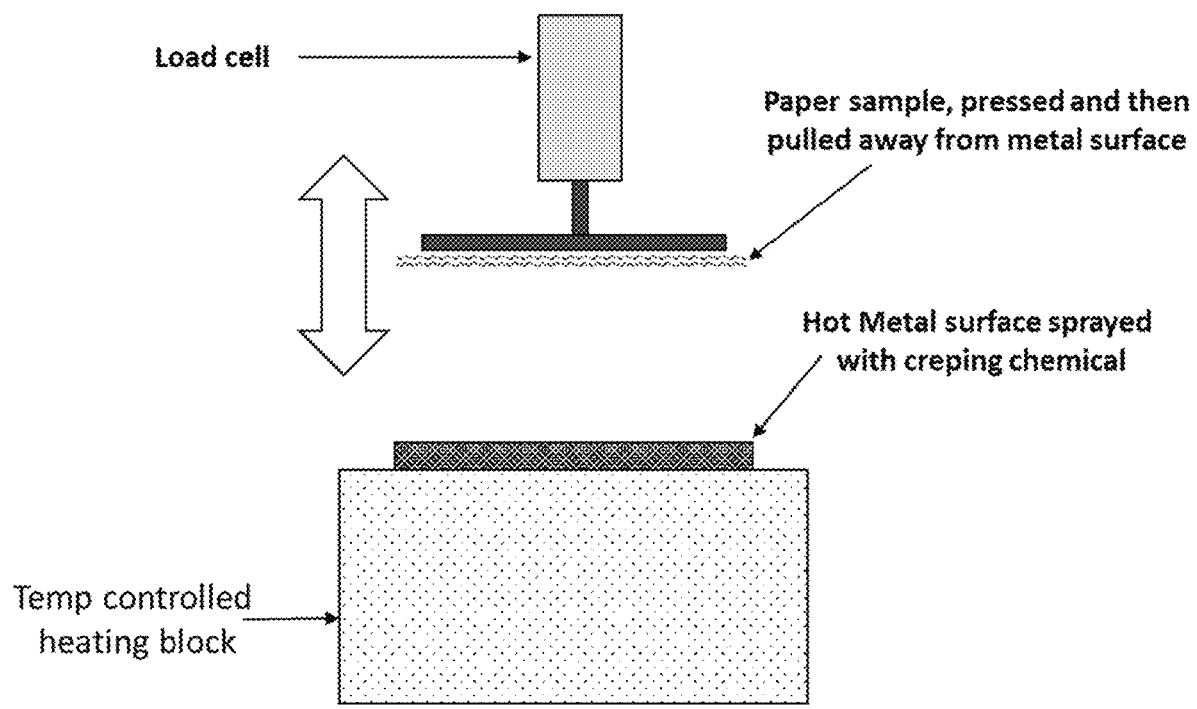
FIG. 2 illustrates the experimental setup of a creping adhesion test used in accordance with some embodiments of the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

The present disclosure is generally directed to Yankee dryer coating compositions and methods for preparing Yankee dryer coating compositions. In an embodiment, the disclosed coating composition may include a creping adhesive resin that is the reaction product of a polyamidoamine and a polyetheramine-epihalohydrin resin. The reaction product may be further reacted with a difunctional cross-linker, such as epihalohydrin, to achieve a desired final viscosity. The resin that results from reacting together the polyamidoamine and the polyetheramine-epihalohydrin resin, when applied as a coating composition on a Yankee dryer, results in a coating layer that provides sufficient adhesion to the fibrous web being dried on the Yankee dryer while resisting hardening over time.

The present disclosure is further directed to a method (100) for producing the above-described creping adhesive resin. In an embodiment, the method includes the steps of (102) reacting a polycarboxylic acid or a derivative of a polycarboxylic acid with a polyamine to form a polyamidoamine; (104) reacting a polyetheramine with a epihalohydrin to form a polyetheramine-epihalohydrin resin; and (106) using the reaction product of the polyetheramine and the epihalohydrin of step (104) as to polyfunctional cross-linker to react with the polyamidoamine of step (102) to produce a polyamidoamine polyetheramine-epihalohydrin resin. In some embodiments, the method may further include the step (108) of further reacting the polyamidoamine polyetheramine-epihalohydrin resin with a difunctional cross-linker to increase the viscosity of the polyamidoamine polyetheramine-epihalohydrin resin. In further embodiments, the method may include the step (110) of adjusting the pH of the polyamidoamine polyetheramine-epihalohydrin resin to a value of from about 2.0 to about 9.0.

Referring to step (102) above, in an embodiment, the polycarboxylic acid may be selected from oxalic acid, malonic acid, succinic acid, glutaric acid, glutamic acid, adipic acid, pimelic acid, suberic acid, azelaic acid, sebacic acid, maleic acid, fumaric acid, terephthalic acid, citric acid, nitrilotriacetic acid, ethylenediaminetetraacetic acid, and mixtures of two or more thereof. In some embodiments, the polycarboxylic acid may be glutaric acid and/or adipic acid. In a particular embodiment, the polycarboxylic acid may be adipic acid.

As noted above, derivatives of polycarboxylic acids may be used in place of, or in combination with, the polycarboxylic acids listed above. Such derivates may include, for example, dimethyl malonate, diethyl malonate, dimethyl succinate, dimethyl glutarate, diethyl glutarate, dimethyl glutamate, diethyl glutamate, dimethyl adipate, diethyl adipate, dimethyl terephthalate, succinic anhydride, maleic anhydride, glutarylchloride, adipoyl chloride, and mixtures of two or more thereof.

With continued reference to step (102) above, in an embodiment, the polyamine is selected from polyalkylene polyamines. For example, the polyamine may be selected from polyethylene polyamines, polypropylene polyamines, poly butylene polyamines, polypentylene polyamines, polyhexylene polyamines, and mixtures of two or more thereof. Non-limiting examples of the foregoing include ethylenediamine, hexamethylenediamine, diethylenetriamine, triethylenetetramine, tetraethylenepentamine, dipropylenetriamine, bis-hexamethylenetriamine, N-methylbis(aminopropyl)amine, aminoethylpiperazine, bis-aminoethylpiperazine, piperazine ethylenediamine, tris(2-aminoethyl)amine, and mixtures of two or more thereof. In a particular embodiment, the polyamine may include a mixture of diethylenetriamine and triethylenetetramine having a ratio by weight of from about 99:1 to about 1:99, for example from about 80:20 to about 20:80, such as from about 70:30 to about 30:70.

In an embodiment, the molar ratio of the total number of primary amine groups of the polyamine, or mixture of polyamines, to the total number of carboxylic acid groups, or derivatives of carboxylic acid groups in the polycarboxylic acid or mixtures of polycarboxylic acids (or derivatives of polycarboxylic acid or mixtures of derivatives of polycarboxylic acids), may be from about 1.30:1 to about 0.80:1, such as from about 1.25:1 to about 0.85:1, for example from about 1.20:1 to about 0.90:1. More generally, a molar ratio of the polyamine to the polycarboxylic acid or the derivative of the carboxylic acid may be from about 0.9:1 to about 1.6:1.

The temperatures employed for carrying out the reaction of step (102) may be from about 110° C. to about 250° C. at atmospheric pressure, such as from about 130° C. to about 230° C., for example from about 160° C. to about 210° C. Where reduced pressures are employed, somewhat lower temperatures may be used. The time required to complete the reaction of step (102) depends on the reaction temperatures and pressures utilized and may vary from about 30 minutes to 7 hours, such as from about 1 hour to about 5 hours. The reaction is continued to a substantial level of completion, as determined by the development of the Reduced Specific Viscosity (RSV) of the polyamidoamine intermediate. The RSV of the polyamidoamine intermediate may be determined by measuring the flow time of a 2% w/v solution of the polyamidoamine intermediate in a solvent of 1N ammonium chloride through a capillary viscometer at 25° C., such as an Ubbelohde capillary viscometer. The flow time of the solvent of 1N ammonium chloride is also determined. Reduced viscosity (RV) is calculated from the following equation:

$$\eta_{red} = (t_s - t_o)/t_s;$$

where:
$\eta_{red}$ is the Reduced Viscosity,
$t_o$ is the flow time of the 1N ammonium chloride solvent, and
$t_s$ is the flow time of the 2% w/v polyamidoamine in 1N ammonium chloride solvent.

Reduced Specific Viscosity is then calculated by dividing the Reduced Viscosity by the actual concentration of the polyaminoamide intermediate solution used, as follows:

$$\eta_{sp} = \eta_{red}/c;$$

where:
$\eta_{sp}$ is the Reduced Specific Viscosity (RSV), and
c is the % w/v concentration of polyamidoamine solution in 1N ammonium chloride.

In accordance with the present disclosure, the reaction between the polycarboxylic acid and the polyamine is continued until the RSV is in a range from about 0.07 dL/g to about 0.25 dL/g, such as from about 0.08 to about 0.22 dL/g, for example from about 0.15 dL/g to about 0.21 dL/g.

Referring now to step (104) of the method described above, in an embodiment, the polyetheramines of the present disclosure may contain 1-3 primary amine groups, such 2 primary amine groups. For example, the polyetheramines that contain 2 primary amine groups are defined by the formula:

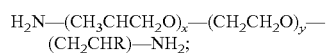

where:
x is from 0 to about 40;
y is from about 0 to about 40; and
R is either H or $CH_3$.

In an exemplary embodiment, the polyetheramine may contain 2 primary amine groups and x is from 3 to 6, y is from 9 to about 40, and R is $CH_3$. For example, the polyetheramine may contain 2 primary amine groups and x is 6, and y is about 39, and R is $CH_3$.

In some embodiments, the epihalohydrin may be epifluorohydrin, epichlorohydrin, epibromohydrin, or mixtures of two or more thereof. In an exemplary embodiment, the epihalohydrin may be epichlorohydrin. In an embodiment, the mole ratio between the number of primary amine groups of the polyetheramine and the epihalohydrin may be from about 0.5:1 to about 4.0:1, for example from about 0.5:1 to about 2.5:1, such as from about 1.0:1 to about 2.0:1, and in an embodiment from about 1.1:1 to about 1.4:1.

In an embodiment, the reaction between the polyetheramine and the epihalohydrin according to step (104) may be conducted in an aqueous solution where the total solids content is from about 10% to 95%, such as from about 20% to about 85%, for example from about 35% to about 80%. Furthermore, the temperatures employed in carrying out the reaction between the polyetheramine and the epihalohydrin may be from about 25° C. to about 80° C., such as from about 30° C. to about 75° C., for example from about 35° C. to about 75° C.

The reaction between the polyetheramine and the epihalohydrin may result in an increase in the viscosity of the reaction mixture. The viscosity of the reaction mixture may be monitored using BYK-Gardner bubble viscosity tubes, for example. The viscosity measurement may be performed by removing a sample of the reaction mixture and cooling it to about 25° C. The sample may then be placed in a standard BYK-Gardner bubble viscosity sample tube, and the rate of rise of the bubble for the reaction sample may be compared to a series of standard BYK-Gardner bubble tubes containing liquids with different viscosities, all held at 25° C. The viscosities of the series of standard BYK-Gardner bubble tubes are designated by letters "A" through to "Z." where "A" represents a low viscosity value and "Z" represents a high viscosity value. The pH of the reaction mixture may be controlled to values from about 7.0 to about 9.0 to aid the development of the viscosity of the reaction mixture, such as from about 8.0 to about 8.8, for example from about 8.3 to about 8.6. The control of the pH of the reaction mixture may be achieved by the continuous addition of an aqueous base solution. Suitable bases may include, but are not limited to, sodium hydroxide, potassium hydroxide, sodium carbonate, sodium bicarbonate, potassium carbonate, potassium bicarbonate, and mixtures of two or more thereof. The concentration of the aqueous base may be from about 5% w/w to about 50% w/w, such as from about 10% w/w to about 40% w/w; for example from about 15% w/w to about 30% w/w. When the viscosity of reaction sample matches the desired BYK-Gardner tube value, the reaction may be stopped by the addition of water and an acid. The reaction mixture may then be diluted further with water and the pH of the mixture may be adjusted further. Suitable acids that may be used to stop the reaction between the polyetheramine and the epihalohydrin, and then adjust the pH of the mixture include, but are not limited to, mineral acids such as sulfuric acid, phosphoric acid, phosphorous acid, hypophosphorous acid, nitric acid, nitrous acid, hydrochloric acid, hydrobromic acid and hydroiodic acid. Suitable acids may further include organic carboxylic acids such as, but not limited to, formic acid, acetic acid, propionic acid, butyric acid, and benzoic acid. Combinations of such acids may also be used.

The pH of the polyetheramine-epihalohydrin intermediate may be from a value of about 2.0 to about 8.0, such as from about 6.0 to about 8.0, for example from about 7.0 to about 7.7. The total solids content of the polyetheramine-epihalohydrin intermediate may be from about 15% to about 25%, such as from about 17% to about 23%, for example from about 19% to about 21%. The Brookfield viscosity of the polyetheramine-epihalohydrin intermediate (at 25° C. as determined using a Brookfield DV II+Pro viscometer, fitted with a LV61 spindle and set to rotate at a speed of 60 rpm) may be from about 20 mPas to about 60 mPas, such as from about 25 mPas to about 55 mPas, for example from about 30 mPas to about 50 mPas.

Referring now to step (106) of the method described above, the polyamidoamine intermediate is reacted with the polyetheramine intermediate. The mass ratio between the total dry content of the polyetheramine-halohydrin intermediate and the total dry content of the polyamidoamine intermediate may be from about 0.07:1 to about 0.62:1, such as from about 0.1:1 to about 0.35:1, for example from about 0.13:1 to about 0.18:1. The reaction between the polyamidoamine intermediate and the polyetheramine-epihalohydrin intermediate may be conducted in aqueous solution where the total solids of the reaction mixture is from about 20% to about 50%, such as from about 25% to about 40%, for example from about 28% to about 33%. The temperature employed for the reaction between the polyamidoamine intermediate and the polyetheramine-epihalohydrin intermediate may be from about 20° C. to about 80° C., such as from about 25° C. to about 70° C., for example from about 25° C. to 60° C. The polyetheramine-halohydrin intermediate may be added to polyamidoamine intermediate when the temperature is from about 60° C. to about 65° C. Water may then be added as needed to give the desired total solids content of the reaction mixture. The polyetheramine-epihalohydrin intermediate may also be added when the initial temperature is about 25° C., water added to give the desired total solids content of the reaction mixture, and then total reaction mixture heated to a temperature of about 60° C., for example.

The reaction mixture may be maintained at the desired reaction temperature from about 60) minutes to about 360 minutes, such as from about 180) minutes to about 300 minutes, for example from about 230) minutes to about 250 minutes. In an embodiment, the reaction between the polyetheramine-halohydrin intermediate and the polyamidoamine intermediate in accordance with step (106) of the method results in an increase in the viscosity of the reaction mixture. The viscosity of the reaction mixture may be monitored using BYK-Gardner bubble viscosity tubes according to the aforementioned procedure described in connection with the preparation of the polyetheramine-epihalohydrin intermediate. If the viscosity of reaction sample exceeds a desired BYK-Gardner tube value (V) before the aforementioned reaction time has elapsed, water may then be added while continuing to heat the reaction mixture, and the reaction may then be allowed to continue at the resulting lower solids content.

The reaction temperature after the addition of water may be maintained at the same value as before or may be increased to a higher value. For example, it may be desirable to use a higher temperature after the reaction has been diluted to the lower solids content to help drive the reaction to completion. The viscosity of the reaction mixture may be monitored using BYK-Gardner bubble viscosity tubes until a value from about "U" to about "V" is attained. Difunctional crosslinkers may then be added to aid the development of the viscosity of the reaction mixture, as described above in connection with step (108). Suitable cross-linkers that may be used to aid the development of the viscosity include, but are not limited to, epihalohydrins such as epifluorohydrin, epichlorohydrin, epibromohydrin, epiiodohydrin, and mixtures of two or more thereof. Other suitable difunctional crosslinkers may include glycidyl mesylate, glycidyl tosylate and diepoxides such as ethylene glycol diglycidyl ether and 1,4-butanediol diglycidyl ether, and mixtures of two or more thereof. In an exemplary embodiment, the difunctional cross-linker may be epichlorohydrin. The mass ratio between the difunctional cross-linker, used to develop the viscosity of the reaction mixture, and the dry mass polyamidoamine intermediate may be from about 0.005:1 to about 0.2:1, such as from about 0.01:1 to about 0.15:1, for example from about 0.02:1 to about 0.10:1. The mass of difunctional cross-linker needed to attained a BYK Gardner bubble viscosity value from about "U" to about "V" is dependent upon the BYK-Gardner bubble viscosity value determined after the reaction mixture has been diluted to lower solids following the reaction between the polyamidoamine intermediate and the polyetheramine-intermediate.

When the reaction mixture has attained a BYK-Gardner bubble viscosity with a value from about "U" to about "V," heating of the reaction mixture may be discontinued, and water may be added to dilute the reaction mixture and to cool the reaction mixture to about 25° C. to yield a polyamidoamine polyetheramine-epihalohydrin product. The pH of the reaction mixture may optionally be adjusted with an acid, as described above in connection with step (110). Suitable acids that can be used to adjust the value of the pH of the product include, but are not limited to, mineral acids sulfuric acid, phosphoric acid, phosphorous acid, hypophosphorous acid, nitric acid, nitrous acid, hydrochloric acid, hydrobromic acid and hydroiodic acid, and mixtures of two or more thereof. Suitable acids may further include organic carboxylic acids such as, but not limited to, formic acid, acetic acid, propionic acid, butyric acid, and benzoic acid. Combinations of such acids may also be used. The value of the pH of the reaction product may be from about 2.0 to 9.0, such as from about 4.0 to about 8.5, for example from about 7.8 to about 8.2.

As initially noted above, the polyamidoamine polyetheramine-epihalohydrin product as described above may be used as an adhesive resin for coating compositions for use in connection with a Yankee dryer in a crepe paper manufacturing process. The coating compositions may be in the form of solutions or dispersions and may be used in combination with one of more other components. Other components of the coating composition may be water-soluble polymers such as, but not limited to, polyamine-epichlorohydrin resins, polyamidoamine-epichlorohydrin resins, polyvinylalcohols, polyvinylamines, polyethyleneimines, polyacrylic acid, polymethacrylic acid, polyacrylamide, polymethacrylamide, polyhydroxyethylacrylate, polyhydroxyethylmethacrylate, polyvinylpyrrolidone, polyethyleneoxide, hydroxyethylcellulose, hydroxypropylcellulose, carboxy methylcellulose, guar gum, starch, agar, chitosan, alginic acid, and mixtures of two or more thereof. When combined with other water-soluble polymers in a coating composition, the weight ratio of the polyamidoamine polyetheramine-epihalohydrin product prepared according to the process of the present disclosure to the other water-soluble polymers may be in the range from about 0.01:0.99 to about 0.99:0.01, such as from about 0.10:0.90 to about 0.90:0.10, for example from about 0.20:0.80 to about 0.80 to about 0.20.

In some embodiments, coating compositions in accordance with the present disclosure may further include one or more release agents, as well as other additives that may affect the creping process. Other additives may include surfactants, dispersants, salts to adjust the water hardness, acid or bases to adjust the value of the pH of the coating compositions, modifiers, and/or other useful additives as known in the art. Paper products manufactured in a creping process using the coating compositions as described above may include, but are not limited to, bath tissue, facial tissue, wipes, paper napkins, paper towels, filter papers and coffee filters.

EXAMPLES

The present disclosure is now illustrated by the following non-limiting examples. It should be noted that various changes and modifications may be applied to the following examples and processes without departing from the scope of this invention, which is defined in the appended claims. Therefore, it should be noted that the following examples should be interpreted as illustrative only and not limiting in any sense.

Experimental Procedure-Creping Adhesion Test (CAT)

The Creping Adhesion Test (CAT) provides a measure of the potential adhesive strength of a coating composition normal to the surface of the Yankee dryer at the temperature of interest. This device includes a circular cast iron platen, 7.5 cm in diameter, which is mounted on an electrically heated block attached to the lower fixture of a Zwick 005 material testing instrument. Above the platen is a fixture capable of attaching a paper sample with double sided tape and linked to a load cell. The upper fixture is capable of bringing the paper sample into contact with the surface of the cast iron platen and then removing the paper from the cast iron platen. The aforementioned experimental setup is illustrated in FIG. 2.

The paper sample is made from a 70:30 mixture of hardwood fiber and softwood fiber and is wet strengthened by the addition of a polyamidoamine-epichlorohydrin wet strength resin and carboxymethylcellulose. It has a grammage of about 68 g/m$^2$ and a percentage of wet tensile strength to dry tensile strength of about 26%.

The cast iron platen is heated to and controlled at the temperature of interest. 1.2 milliliters of a 4% w/w solution of the coating package under test is then applied evenly as possible over the surface of the cast iron block using an airbrush. Once the test solution has been applied and allowed to dry, the upper fixture of the tester lowers the paper sample (at a speed of 50 mm/min) onto the cast iron platen until a compressive force of 300 N is registered. The upper fixture then pulls the paper sample away from the surface of the cast iron block at speed of 3000 mm/min. The force required to pull the paper away from the surface of the cast iron block is divided by the surface area of the cast iron platen to yield the CAT strength and is a measure of the adhesive strength of the coating composition.

Experimental Procedure—Peel Test

Figure 3:
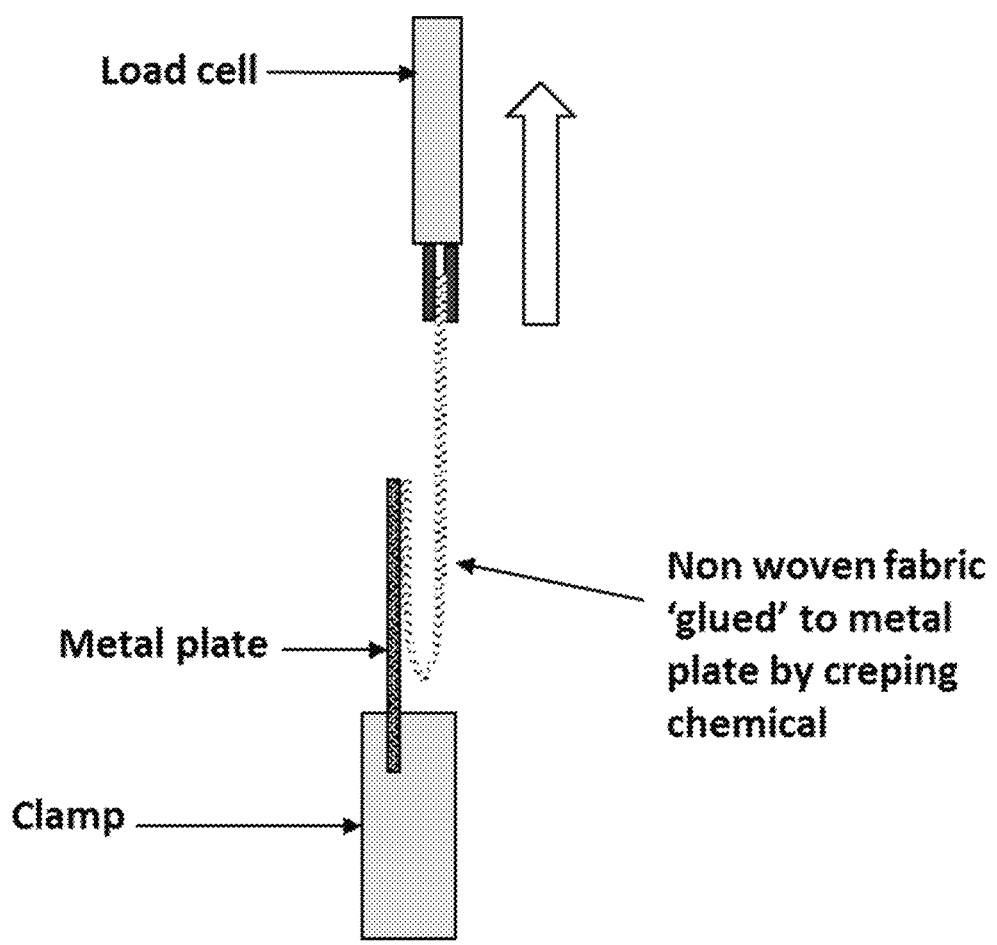
FIG. 3 illustrates the experimental setup of a peel test used in accordance with some embodiments of the present disclosure.

Another test used to assess the adhesive strength of a test coating composition is the peel test. This test involves attaching a non-woven fabric to the surface of a stainless-steel metal plate and then measuring the force to peel the non-woven fabric away from the surface of the metal plate. The aforementioned experimental setup is illustrated in FIG. 3. The woven-fabric used is a 50 g/m$^2$ wet laid fabric (BO 505) made up from 60% polyether sulfone (PES), 20% Viscose (CV), and 20% wood pulp manufactured by Freudenberg Performance Materials. The dimensions of the metal plate are 100 mm by 25 mm. The surface of the metal plate is degreased using petroleum ether. The non-woven fabric is cut to dimensions 250 mm by 25 mm.

100 mm of the non-woven test fabric are immersed in 2% w/w solution of the coating composition, and the solution is allowed to soak into the fabric. The soaked part of the non-woven fabric is then laid and positioned onto the surface of the metal plate. Any air bubbles that appear are gently depressed, and once the fabric is correctly positioned on the plate, the plate and fabric are placed onto a hotplate set to a surface temperature of about 145° C. The fabric then dries and adheres to the plate. During the drying process, the surface temperature is the fabric is monitored using an infra-red temperature probe, with an emissivity set to 0.95. When the surface of the fabric, atop the metal plate, has reached a temperature of 145° C., it is considered to be dry.

After 3 minutes on the hot plate at 145° C., 20 mm of the fabric is peeled away to expose the part of the metal plate. This exposed part of the plate is then mounted into the lower clamp of the Zwick 005 material testing instrument. To the upper clamp of the Zwick 005 material testing instrument a load cell is fixed that allows for the force required to peel the fabric away from the metal plate to be measured. After the mounting of the test plate into the lower clamp of the Zwick 005 material testing instrument, the surface temperature of the fabric attached to the metal plate is monitored using the infra-red temperature probe. When the surface temperature of the fabric attached to the metal plate has dropped to specific temperature of interest, the upper end of the test fabric is quickly clamped into the upper clamp of the of the Zwick 005 material testing instrument, such that there is no slack in the test fabric. The test is then started with the upper clamp moving at a speed of 1000 mm/min, peeling the fabric away from the surface of the metal plate. The load cell attached to the upper clamp determines the force required to peel the fabric away from the surface of the metal plate. The average force required to peel the fabric away from the surface of the metal plate is divided by the width of the metal plate to yield the peel strength of the adhesive composition.

Experimental Procedure Crepe Simulator

Figure 4:
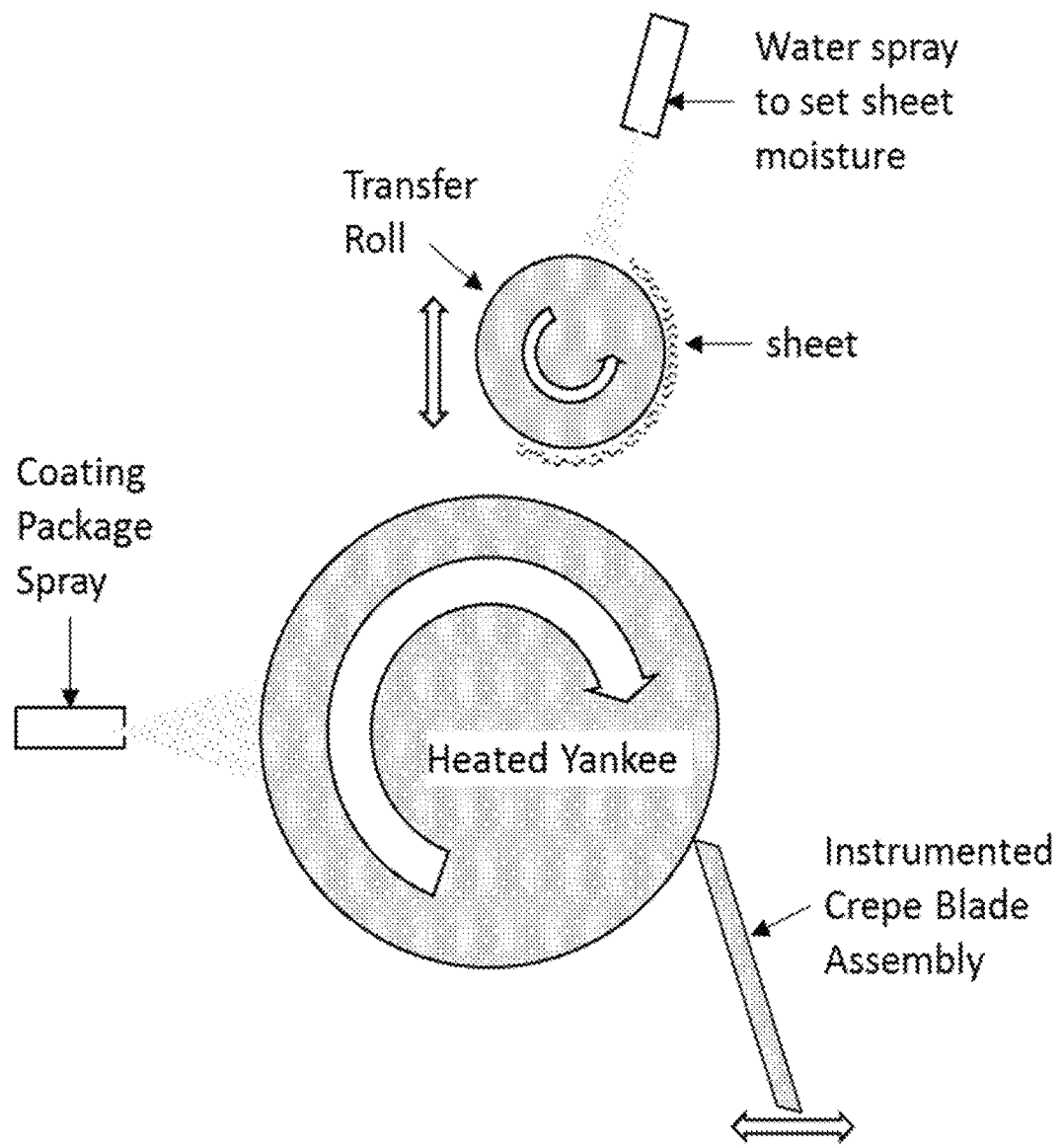
FIG. 4 illustrates a functional schematic of a crepe simulator used in accordance with some embodiments of the present disclosure.
Figure 5:
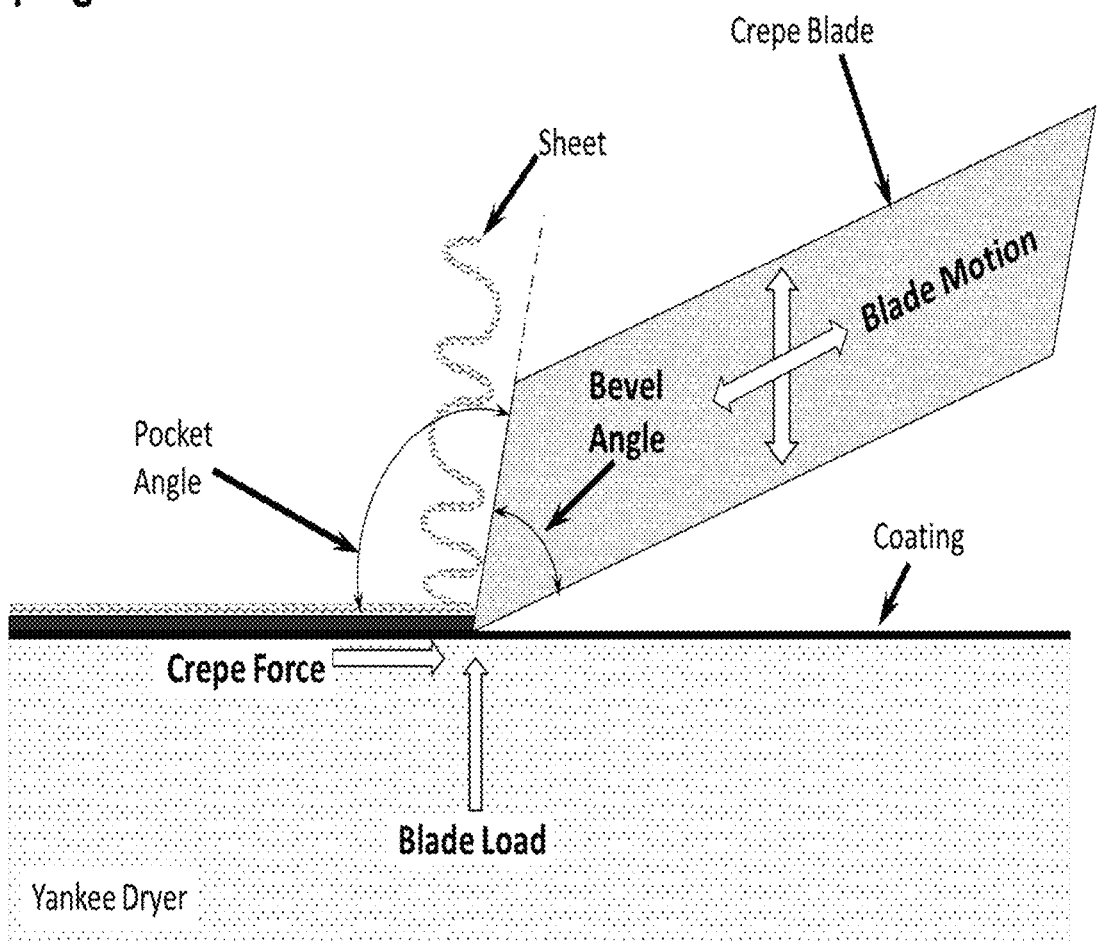
FIG. 5 is a process diagram illustrating the use of the simulator shown in FIG.

To assess the creping performance of a coating composition, a device referred to as a "crepe simulator" is employed. A functional schematic of the crepe simulator is illustrated in FIG. 4 and the creping process using this device is illustrated in FIG. 5. The device is used to simulate the process of drying and creping both tissue and towel products. The paper used on the crepe simulator device is made from a 70:30 mixture of hardwood fibers and softwood fibers. The paper has a grammage of about 18 g/m$^2$ and is cut to dimensions of about 50.8 cm (20 in) in length to about 7.6 cm (3 in) in width.

The components of the device illustrated in FIG. 4 include:

1. The heated Yankee dryer is a cylinder 0.40 m (16 in) in diameter and 0.092 m (3.75 in) in width. The shell of the cylinder is cast iron of a type similar to a standard Yankee dryer cylinder used in the production of tissue and towel products. The cylinder is heated internally using radiant heaters of sufficient heat output to heat the outer surface of the cylinder to temperatures typically found on industrial Yankee drying cylinders, for example from about 90° C. to about 140° C. A servo motor is used to rotate the cylinder. The servo motor is capable of achieving a speed up to about 1400 m/min, which is equivalent to the speed at which many tissue and towel producing machines are run.
2. The instrumented crepe blade assembly holds a crepe blade in a fixed but adjustable orientation, and it positions the blade against the Yankee dryer surface for the purpose of creping a sheet that is adhered to the Yankee dryer surface. The assembly includes a multi-axis force transducer that measures the load that the blade experiences both tangential to the Yankee dryer surface (creping force) and perpendicular to the Yankee dryer surface (blade loading force). The positioning of the blade assembly is performed using a servo motor. The length of the sheet adhered to the Yankee dryer surface is less than the circumference of the Yankee dryer cylinder, and as such the creping process is completed in a fraction of a second. Due to this short time frame, the motion control of the blade assembly is accomplished via positional control. Prior to the creping operation, with the Yankee dryer in a stationary position, the blade assembly is moved such that the blade is in contact with the Yankee dryer cylinder. The location is adjusted until the desired load perpendicular to the Yankee dryer surface is obtained.
3. The coating composition sprayer is used to apply the coating to the Yankee dryer. The components of the coating composition are premixed and held in a pressurized container. An air atomizing spray nozzle controlled via solenoid valves is used to spray the coating composition onto the heated Yankee dryer surface. The amount of the composition sprayed is controlled by regulating the time duration of the spray. The heat flux of the heaters used to heat the Yankee dryer is less than that of condensing steam. Therefore, there is a time delay, prior to the applications of the sheet to be creped, to allow for the water in the coating composition to be evaporated. The spraying occurs with the Yankee dryer cylinder rotating at about 1 to about 2 revolutions/second.
4. The water sprayer and transfer roll are used to wet the sheet that is to be creped and to apply it to the Yankee dryer. The transfer roll is a vacuum roll that is powered by a servo motor. The vacuum is used to hold the sheet on the transfer roll. A sheet is manually placed on the stationary transfer roll, and the roll is then commanded to rotate at a predetermined speed and the water spray is activated. Sheet moisture is regulated by the rotational speed of the transfer roll. Once the sheet is wetted, the coating composition spray is applied to the Yankee dryer. Upon completion of the drying of the coating composition, the transfer roll is mechanically lowered into contact with a preset loading while the Yankee dryer is rotating at about 1 to about 2 revolutions/second. The sheet is thus laminated onto the Yankee dryer.

The standard process for using the crepe simulator to simulate the creping process, as shown in FIG. 5, is as follows:

1. Set the load for the transfer roll onto the Yankee dryer.
2. Identify the blade position for the desired blade loading during creping.
3. Apply a sheet to the transfer roll and wet the sheet with the water spray.
4. Apply the coating composition to the Yankee dryer using the coating spray system.
5. Wait for a preset time to dry the coating composition.
6. Lower the transfer roll onto the Yankee dryer and apply the predetermined loading allowing the wet sheet to be laminated onto the Yankee dryer, then separate the transfer roll from the Yankee dryer.
7. Wait for a preset time for the sheet to be partially dried.
8. Increase the speed of the Yankee dryer to the desired speed.
9. Rapidly move the crepe blade to the predetermined creping position in such a way that the initial point of contact is on a section of the Yankee dryer that is covered by the sheet and allow the sheet to be creped.
10. Return the crepe blade to a position where it is not in contact with the Yankee dryer.

11. Return the Yankee dryer to a rotational speed of about 1 to about 2 revolutions/second.
12. Clean the Yankee dryer.

The quality of the sheet produced on the crepe simulator is assessed by measuring the length of the crepe paper and expressing this as a ratio of the original length of the paper, as given in the following formula:

crepe ratio=$(L-x)/L$;

where L is the original length of the paper prior to creping and x is the length of the creped/compacted sheet.

The creped sheet is then stretched out by attaching a 50 g weight to the end of the creped sheet, which is then suspended vertically. This action pulls out any "false" crepe structure. After the paper has been stretched out, the length of the paper is remeasured and the "stretched" crepe ratio is determined, as given by the following formula:

stretched crepe ratio=$(L-y)/L$ where y is the length of the stretched paper.

The "crepe quality" is the ratio between the stretched crepe ratio and the crepe ratio as given by the following formula:

crepe quality=stretched crepe ratio/crepe ratio×100.

Where the value of the crepe quality is low and tends towards 0%, the crepe structure is considered to be "coarse". Where the value of the crepe quality is high and tends towards 100%, the crepe structure is considered to be "fine". A fine crepe structure is considered to be needed to produce a soft sheet. The creping performance of the coating package may also be assessed further by inspecting the sheet under a microscope, or other image analysis device, and counting the number of ridges produced in the sheet per a defined length. This is referred to as the "crepe count." Increases in the crepe count number are considered to correspond to a softer sheet.

Experimental Procedure—Doctorability Test

To assess the "doctorability" of the coating composition, the crepe simulator device is employed using a modified procedure. The term "doctorability" as used herein refers to the relative ease with which the web is dislodged from the dryer without producing defects or requiring frequent changes of blades to prevent excessive build-up. The primary differences are that a sheet is not used, the coating composition is applied using repeated spray operations, and multiple blade creping positions are used. The following procedure is used:

1. Identify the blade position for approximately 200% (200 N) of the standard blade loading for creping a sheet.
2. Identify the blade position for approximately 20% (20 N) of the standard blade loading for creping a sheet.
3. Using the positions identified in steps 1. and 2., identify five equally separated blade creping positions that span the range of positions identified in steps 1. and 2.
4. Through trial and error and using gravitational methods identify a coating spray time that will yield approximately 5 g wet weight of material applied to the Yankee dryer.
5. Using the time identified in step 4, spray the coating composition onto the heated Yankee dryer surface with the Yankee dryer rotating at about 1 to about 2 revolutions/second.
6. Wait about three minutes for the coating composition to dry with the Yankee dryer continuing to rotate at about 1 to about 2 revolutions/second.
7 Repeat steps 5. and 6. About ten times, with a constant Yankee dryer rotational speed of about 1 to about 2 revolutions/second. The objective is to build a thick cured layer coating on the Yankee dryer.
8. Set the transfer loading system such that it will not contact the Yankee dryer.
9. Set the position of the creping blade for the lowest of the loadings determined in step 3.
10. Position a container around the crepe blade to collect any coating that might be scraped from the Yankee dryer.
11. Increase the Yankee dryer speed to the desired creping speed.
12. Rapidly move the crepe blade to the predetermined creping position, allowing the blade to scrape the coating from the surface.
13. Return the crepe blade to a position where it is not in contact with the Yankee dryer.
14. Return the Yankee rotational speed to about 1 to about 2 revolutions/second.
15. Take photographic images of the material scraped from the Yankee dryer surface.
16. Weigh the material scraped from the Yankee dryer surface.
17. Repeat steps 9.-16. for each of the blade positions identified in step 3.

Figure 6:
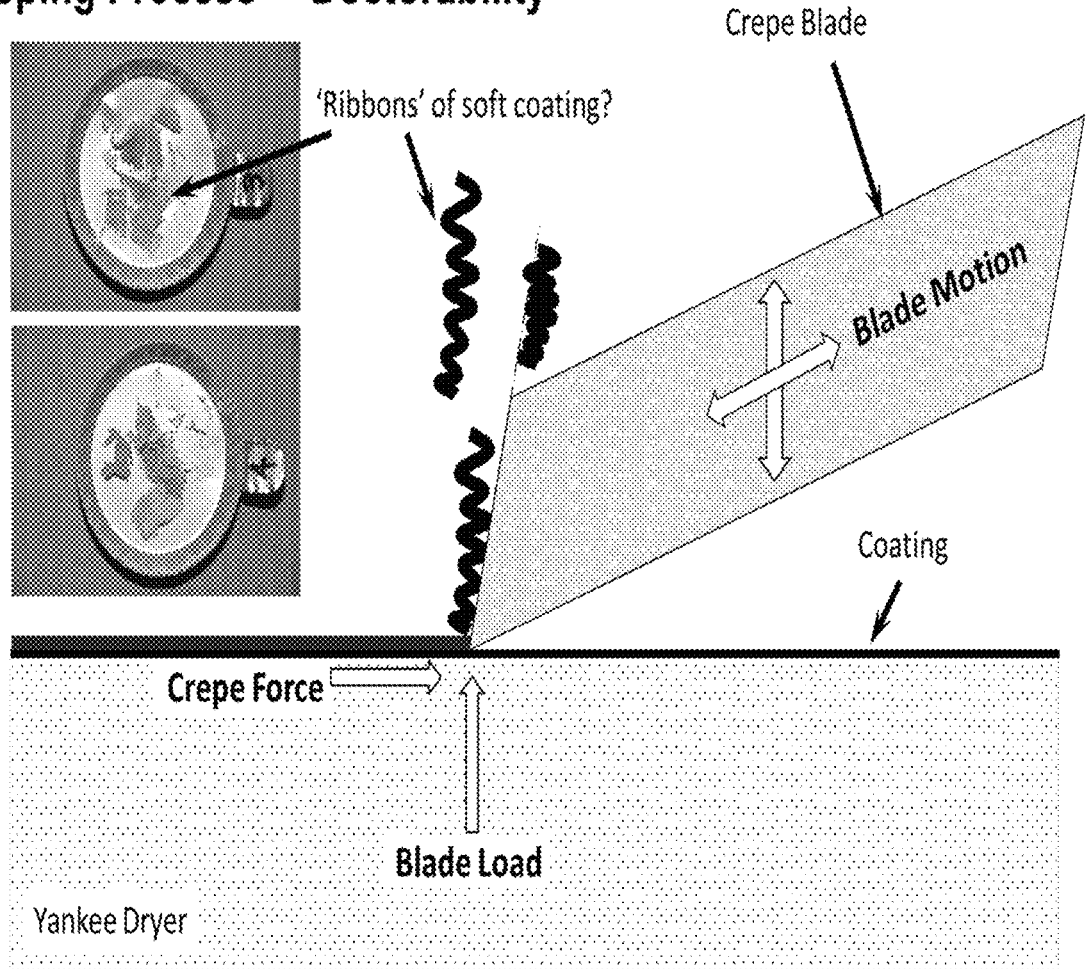
FIG. 6 illustrates the ribbon-like characteristic of material removed from the coating layer that is indicative of a coating layer that is considered to be softer and more doctorable with greater integrity.
Figure 7:
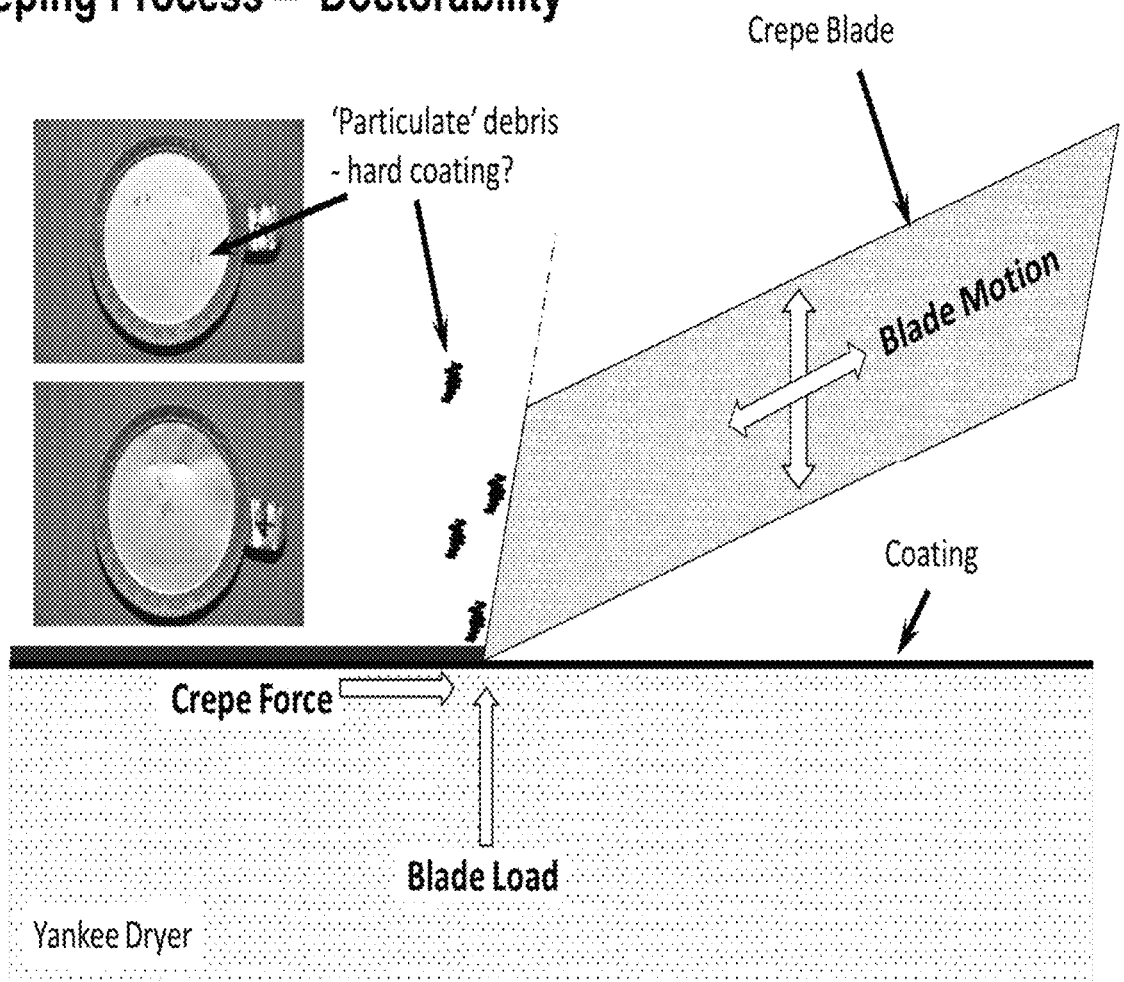
FIG. 7 illustrates the particulate and granular nature of the material removed from the coating layer that is indicative of a hard coating layer with little integrity.

The more mass that is removed by the creping doctor blade and collected from the coating layer, the more "doctorable" the coating layer is considered to be. The ribbon-like characteristic of the material removed from the coating layer is indicative of a coating layer that is considered to be softer and more doctorable with greater integrity. This characteristic is illustrated in FIG. 6. The particulate and granular nature of the material removed from the coating layer is indicative of a hard coating layer with little integrity. This characteristic is illustrated FIG. 7.

Example 1—Preparation of the Polyamidoamine Intermediate

A one liter round bottom flange flask, fitted with an anchor stirrer, thermocouple, distillation receiving equipment, and a heating mantle was charged with 440.0 g of triethylenetetramine and 16.3 g of diethylenetriamine. To this mixture of polyamines was then added 114 g of water. To this aqueous mixture of polyamines, 463 g of adipic acid was added over a period of one hour. Once all of the adipic acid was added, the reaction mixture was heated to 169° C. to 170° C. over a period of 180 minutes. During this heating up period, water was evolved and collected via the distillation equipment. Once the reaction reached a temperature of 169° C. to 170° C., it was "cooked" at this temperature for 65 minutes while collecting distillate water. During this time, 88% of the theoretical amount of distillate water was collected. Once the cook time elapsed, heating was discontinued and 350 g of water was added to the reaction mixture to quench any further reaction. The contents of the flange flask were then transferred to a 3-liter glass beaker where 1105 g of water was then added to yield the final polyamidoamine intermediate product. The product was then cooled to ambient temperature and transferred to a bottle. The total solids of the product was determined to be 36.1% and the Reduced Specific Viscosity (RSV) was determined to be 0.174 dL/g using the method described hereinbefore.

Example 2—Preparation of the Polyetheramine-Epichlorohydrin Intermediate

A one liter round bottom flange flask fitted with an anchor stirrer, thermocouple, condenser, and a heating mantle was charged with 500 g of a 75% aqueous solution of a polyetheramine, where the polyetheramine is defined by the following formula:

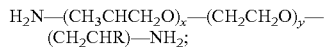

where R is —CH$_3$, x is approximately 6, and y is approximately 39.

The temperature of the aqueous solution of polyetheramine was increased to 35° C. 41 g of epichlorohydrin was then added to the aqueous solution of polyetheramine, and the temperature of the reaction mixture was increased to 39° C. to 40° C. over a period of 15 to 30 minutes. The reaction mixture was then maintained at 39° C. to 40° C. for 90 to 105 minutes. Once this time elapsed, 335 g of water was added to the reaction mixture. 50% w/w of an aqueous solution of sodium hydroxide was then fed to the reaction mixture at a rate of 0.05 milliliters/min to maintain the pH of the reaction mixture at a value between 8.0 and 8.5 when measured at 25° C. The temperature of the reaction mixture was then increased to 69° C. to 70° C. over a period of 45 to 60 minutes. The temperature of the reaction mixture was then maintained at 69° C. to 70° C., and the viscosity of the reaction mixture was monitored using BKY-Gardner bubble viscosity tubes. When the viscosity of the reaction attained a BKY-Gardner viscosity of "V," heating was discontinued, and a solution of 2.3 g of 96% w/w sulfuric acid and 77 g of water was added to the reaction mixture. The reaction mixture was then diluted further with the addition of 1147 g of water, and the pH was adjusted to a value of 7.0 with the addition 96% w/w sulfuric acid. The total solids content of the product was determined to be 20.0% and the Brookfield viscosity of the product at 25° C. was measured as 41 mPas using a DVII+Pro Brookfield viscometer fitted with a LV61 spindle and operated at 60 rpm.

Example 3—Preparation of the Polyamidoamine Polyetheramine-Epichlorohydrin

A one liter round bottom flange flask fitted with an anchor stirrer, thermocouple, condenser, and a heating mantle was charged with 500 g of the polyamidoamine intermediate product produced in Example 1. 56.5 g of water was then added to the polyamidoamine intermediate product, and the temperature of this mixture was raised to 59° C. to 60° C. 135.3 g of the polyetheramine-epichlorohydrin intermediate product of Example 2 was then added to the polyamidoamine intermediate product. The temperature of the reaction mixture was maintained from 59° C. to 60° C. and the viscosity of the reaction mixture was monitored using BKY-Gardner bubble viscosity tubes. After 240 minutes, the reaction mixture attained a BKY-Gardner viscosity of "V". 138.4 g of water was added to the reaction mixture and the BKY-Gardner viscosity was measured as "S." The temperature of the reaction mixture was then raised to 69° C. to 70° C. Once the temperature of the reaction mixture was between 69° C. to 70° C., epichlorohydrin was then added to the reaction mixture, and the viscosity of the reaction mixture was monitored using BKY-Gardner bubble viscosity tubes. When the reaction mixture attained a BKY-Gardner viscosity of "V," a total of 1.2 g of epichlorohydrin was added, heating was discontinued, and 335 g of water was added. 26.4 g of 85% w/w phosphoric acid was then added to the mixture followed by 87 g of water to yield the final product. The total solids of the final product was determined to be 18.0%. The value of the pH of the final product was measured as 8.0, and the Brookfield viscosity of the final product at 25° C. was measured as 225 mPas as using a DVII+Pro Brookfield viscometer fitted with a LV62 spindle and operated at 60 rpm.

Example 4—Creping Adhesion Test

The paper sample was made from a 70:30 mixture of hardwood fiber and softwood fiber and was wet strengthened by the addition of a polyamidoamine-epichlorohydrin wet strength resin and carboxymethylcellulose. It had a grammage of about 68 g/m$^2$ and a percentage of wet tensile strength to dry tensile strength of 26%.

Figure 8:
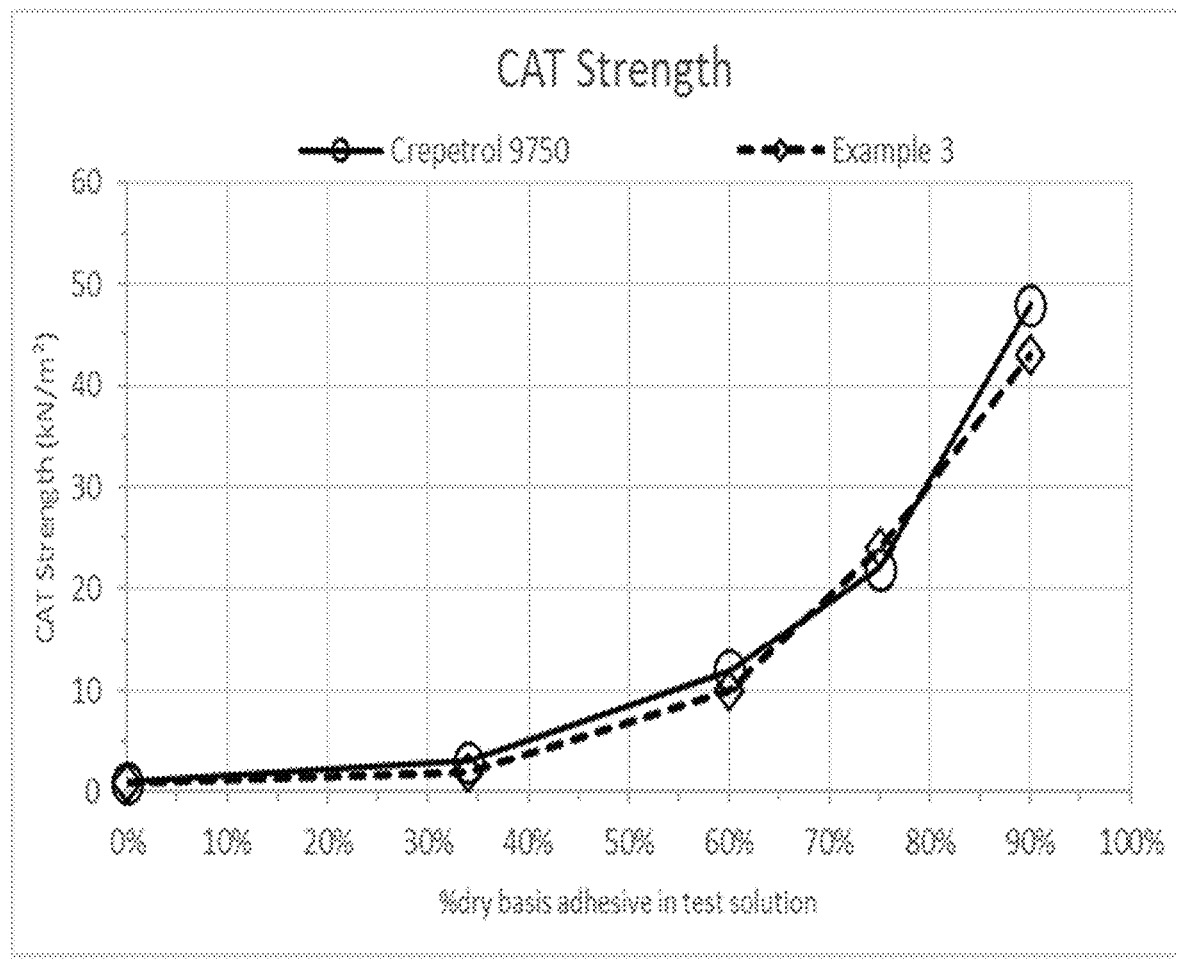
FIG. 8 is a graph illustrating the results of creping adhesion testing performed in accordance with some examples of the present disclosure.

The cast iron platen was heated to a temperature of 120° C. The product from Example 3 was mixed with a solution of polyvinylalcohol at different ratios yielding a number of 4% w/w coating composition solutions containing between 100% to 0% of Selvol 350, a grade of polyvinylalcohol with a degree of hydrolysis between 98% to 99% and 4% w/w solution viscosity of 62 mPas to 72 mPas, and 0% to 100% of the product from Example 3 on a dry basis. For comparison, a similar series of coating composition solutions were prepared by mixing a solution of the same grade of polyvinylalcohol with Crepetrol 9750, a commercial PAE creping adhesive sold by Solenis LLC, Wilmington, Delaware, USA. 1.2 milliliters of a 4% w/w solution of the adhesive compositions described above were then applied evenly over the surface of the cast iron block using an airbrush. Once the test solution was applied and dried, the upper fixture of the tester lowered the paper sample (at a speed of 50 mm/min) onto the cast iron platen until a compressive force of 300 N was registered. The upper fixture then pulled the paper sample away from the surface of the cast iron block (at a speed of 3000 mm/min). The force required to pull the paper away from the surface of the cast iron block was divided by the surface area of the cast iron platen yield the CAT strength. The results of this testing are shown in TABLE 1, below, and illustrated in FIG. 8.

TABLE 1

| CAT Test Results | | | |
|---|---|---|---|
| Creping Adhesive | % Creping Adhesive | % PVOH | CAT Strength (kN/m$^2$) |
| Crepetrol 9750 | 0 | 100 | 1 |
| Crepetrol 9750 | 34 | 66 | 3 |
| Crepetrol 9750 | 60 | 40 | 12 |
| Crepetrol 9750 | 75 | 25 | 22 |
| Crepetrol 9750 | 90 | 10 | 48 |
| Example 3 | 0 | 100 | 1 |
| Example 3 | 34 | 66 | 2 |
| Example 3 | 60 | 40 | 10 |
| Example 3 | 75 | 25 | 24 |
| Example 3 | 90 | 10 | 43 |

The results show that as polyvinylalcohol is replaced with a creping adhesive resin in the coating composition, the CAT strength of the coating composition increases. The results also show that the product from Example 3 provides the same increase in CAT strength as Crepetrol 9750.

Example 5—Peel Test

Figure 9:
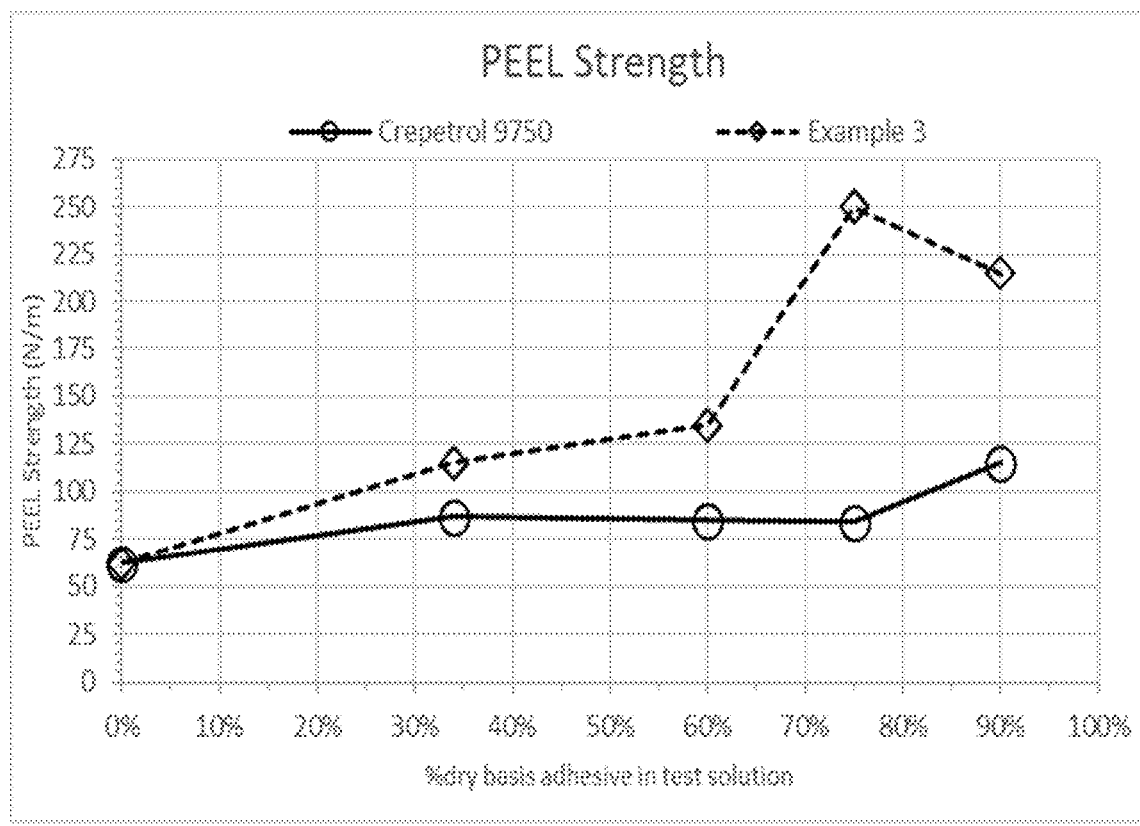
FIG. 9 is a graph illustrating the results of peel testing performed in accordance with some examples of the present disclosure.

The woven-fabric used was a 50 g/m$^2$ wet laid fabric (BO 505) made up from 60% polyether sulfone (PES), 20% Viscose (CV). and 20% wood pulp manufactured by Freudenberg Performance Materials. The dimensions of the metal plate were 100 mm by 25 mm. The surface of the metal plate was degreased using petroleum ether. The non-woven fabric was cut to dimensions 250 mm by 25 mm. 100 mm of the non-woven test fabric were immersed in 2% w/w solution of the coating composition, and the solution was allowed to soak into the fabric. Specifically, the product from Example 3 was mixed with a solution of Selvol 350 at different ratios to yield a series of 2% w/w coating composition solutions containing between 100% to 0% of polyvinylalcohol and 0% to 100% of the product from Example 3 on a dry basis. For comparison, a similar series of solutions was prepared by mixing a solution of the same grade of polyvinylalcohol with Crepetrol 9750. The soaked part of the non-woven fabric was then laid and positioned onto the surface of the metal plate. The plate and fabric were then placed onto a hotplate set to a surface temperature of 145° C. When the surface of the fabric atop the metal plate reached a temperature of 145° C., it was considered to be dry. After 3 minutes on the hot plate at 145° C., 20 mm of the fabric was peeled away to expose part of the metal plate. The test was then started with the upper clamp moving at a speed of 1000 mm/min, peeling the fabric away from the surface of the metal plate. The results of this testing are shown in TABLE 2, below, and illustrated in FIG. 9.

TABLE 2

Peel Test Results

| Creping Adhesive | % Creping Adhesive | % PVOH | PEEL Strength (N/m) |
|---|---|---|---|
| Crepetrol 9750 | 0 | 100 | 62 |
| Crepetrol 9750 | 34 | 66 | 87 |
| Crepetrol 9750 | 60 | 40 | 85 |
| Crepetrol 9750 | 75 | 25 | 84 |
| Crepetrol 9750 | 90 | 10 | 115 |
| Example 3 | 0 | 100 | 62 |
| Example 3 | 34 | 66 | 115 |
| Example 3 | 60 | 40 | 135 |
| Example 3 | 75 | 25 | 250 |
| Example 3 | 90 | 10 | 215 |

The results show that as polyvinylalcohol is replaced with a creping adhesive resin in the coating composition, the peel strength increases. The results also show that the product from Example 3 provides a greater increase in peel strength compared to Crepetrol 9750.

Example 6—Crepe Simulator Testing

The paper used on the crepe simulator device was made from a 70:30 mixture of hardwood fibers and softwood fibers. It had a grammage of about 18 g/m² and was cut to dimensions of about 50.8 cm (20 in) in length and about 7.6 cm (3 in) in width. The heated Yankee dryer included a cylinder 0.40 m (16 in) in diameter and 0.092 m (3.75 in) in width. The shell of the cylinder was cast iron of a type similar to standard Yankee cylinder used in the production of tissue and towel products. The cylinder was heated internally using radiant heaters of sufficient heat output to heat the outer surface of the cylinder to a temperature of 115° C. When creping paper the cylinder was set to rotate at a speed of 1400 m/min.

Figure 10:
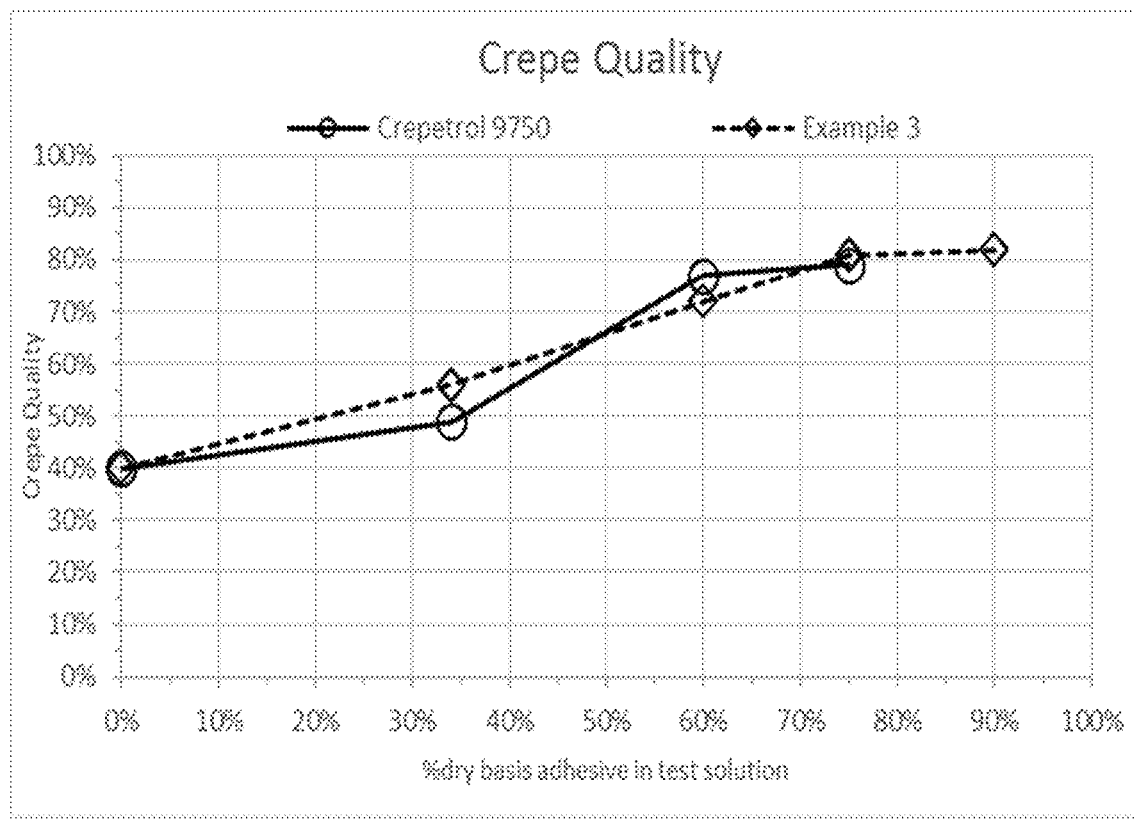
FIG. 10 is a graph illustrating the results of crepe simulator testing performed in accordance with some examples of the present disclosure.

The product from Example 3 was mixed with a solution of polyvinylalcohol at different ratios yielding a series of 2% w/w coating compositions containing between 100% to 0% of Selvol 350 and 0% to 100% of the product from Example 3 on a dry basis. For comparison, a similar series of coating composition solutions was prepared by mixing a solution of the same grade of polyvinylalcohol with Crepetrol 9750. The coating composition solutions were used to crepe paper using the procedure described hereinbefore, and the crepe quality was determined. The results of this testing are shown in TABLE 3, below, and illustrated in FIG. 10.

TABLE 3

Crepe Simulator Test Results

| Creping Adhesive | % Creping Adhesive | % PVOH | Crepe Quality (%) | Crepe Count (no./in.) |
|---|---|---|---|---|
| Crepetrol 9750 | 0 | 100 | 40 | 59 |
| Crepetrol 9750 | 34 | 66 | 49 | |
| Crepetrol 9750 | 60 | 40 | 77 | |
| Crepetrol 9750 | 75 | 25 | 79 | 76 |
| Crepetrol 9750 | 90 | 10 | | |
| Example 3 | 0 | 100 | 40 | |
| Example 3 | 34 | 66 | 56 | |
| Example 3 | 60 | 40 | 72 | |
| Example 3 | 75 | 25 | 81 | 105 |
| Example 3 | 90 | 10 | 82 | |

The results show that as polyvinylalcohol is replaced with increasing amounts of a creping adhesive resin in the coating composition, the crepe quality of the paper produced on the crepe simulator increases. The results also show that the product from Example 3 provides the same increase in the crepe quality of the sheet as Crepetrol 9750.

Figure 11:
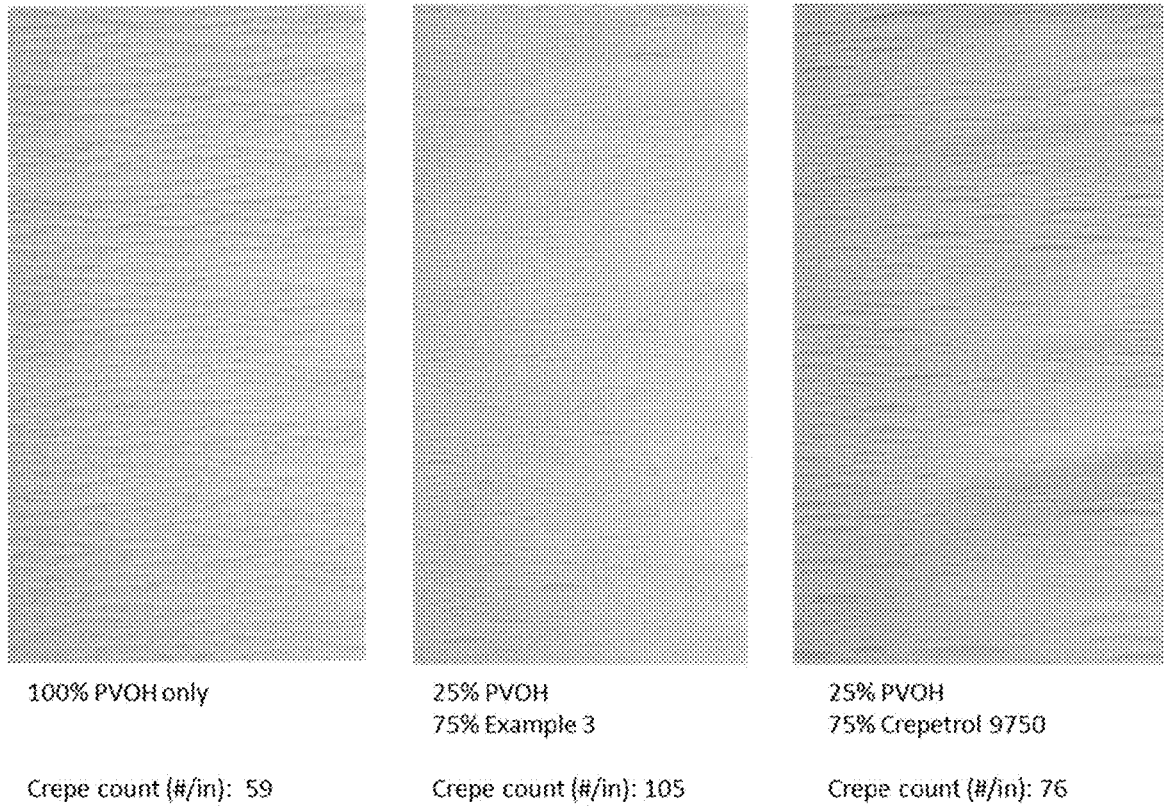
FIG. 11 are images illustrating the crepe count observed as a result of the crepe simulator testing performed in accordance with some examples of the present disclosure.

The creping performance of the coating composition can also be assessed further by inspecting the sheet under a microscope, or other image analysis device, and counting the number of ridges produced in the sheet per a defined length. This is referred to as the "crepe count." In TABLE 3, and illustrated in FIG. 11, it can be seen that the crepe count of the paper is increased when the PVOH is replaced with a creping adhesive. It can also be seen that for the same replacement of PVOH with a creping adhesive, the product from Example 3 yields paper with a high crepe count compared to Crepetrol 9750. This means that paper produced with the product of Example 3 in the coating composition will be softer.

Example 7—Doctorability Testing

Figure 12:
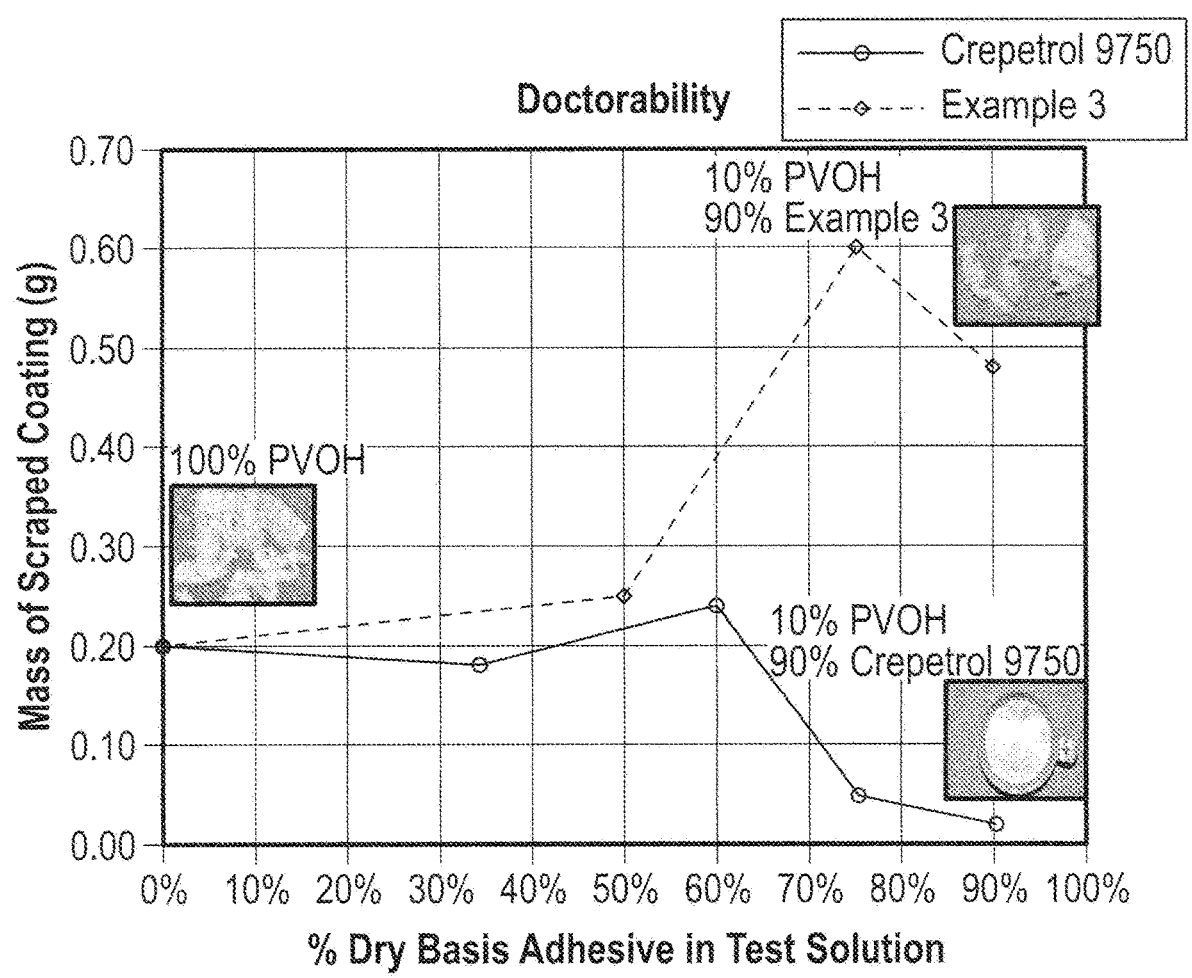
FIG. 12 is a graph illustrating the results of doctorability testing performed in accordance with some examples of the present disclosure.

The product from Example 3 was mixed with a solution of Selvol 350 at different ratios yielding a series of 2% w/w coating composition test solutions containing between 100% to 0% of polyvinylalcohol and 0% to 100% of the product from Example 3 on a dry basis. For comparison, a similar series of solutions was prepared by mixing a solution of the same grade of polyvinylalcohol with Crepetrol 9750. Each adhesive solution was applied to the surface of the Yankee dryer of the crepe simulator and then scraped off with the crepe blade using the procedure described hereinbefore. The material scraped off by the creping blade was collected, weighed, and photographed. The results are given in TABLE 4, below, and illustrated in FIG. 12.

TABLE 4

Doctorability Test Results

| Creping Adhesive | % Creping Adhesive | % PVOH | Mass of Scraped Coating (g) | Physical Nature |
|---|---|---|---|---|
| Crepetrol 9750 | 0 | 100 | 0.20 | Ribbon |
| Crepetrol 9750 | 34 | 66 | 0.18 | |
| Crepetrol 9750 | 60 | 40 | 0.24 | |
| Crepetrol 9750 | 75 | 25 | 0.05 | |
| Crepetrol 9750 | 90 | 10 | 0.02 | Dusty/Particulate |
| Example 3 | 0 | 100 | 0.20 | Ribbon |
| Example 3 | 50 | 50 | 0.25 | |
| Example 3 | 75 | 25 | 0.60 | |
| Example 3 | 90 | 10 | 0.48 | Ribbon |

The results show that when polyvinylalcohol is replaced with increasing amounts of Crepetrol 9750 in the adhesive composition, it becomes progressively more difficult to remove from the surface of the Yankee dryer cylinder with the crepe blade. The material that was removed by the crepe blade was observed to be more particulate and dustier in nature. This means that the coating is becoming harder in nature as more Crepetrol 9750 is used in the coating composition. When polyvinylalcohol is replaced with increasing amounts of the product from Example 3 in the coating composition, it becomes easier to remove from the surface of the Yankee dryer cylinder with the crepe blade. The material that was removed by the crepe blade was "ribbon-like" in nature, a characteristic that is considered to be desirable by producers of tissue and towel products. This means that the coating is becoming progressively softer in nature as more of the product from Example 3 is used in the coating composition.

Accordingly, the present disclosure has provided improved coating compositions for use in Yankee dryer operations. The improved coating compositions desirably provide a sufficient adhesive effect to the fibrous web such that upon removal from the dryer, the resulting paper product exhibits the desirable physical properties of surface texture, tensile strength, and bulk. Furthermore, the improved coating compositions desirably avoid the tendency to become relatively harder over time in order to prevent wear on the doctor blade and/or reduction in the aforementioned desirable physical properties.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method for preparing an adhesive resin for use in a coating composition for a crepe paper manufacturing process, the method comprising the steps of:
   a. reacting a polycarboxylic acid chosen from oxalic acid, malonic acid, succinic acid, glutaric acid, glutamic acid, adipic acid, pimelic acid, suberic acid, azelaic acid, sebacic acid, maleic acid, fumaric acid, terephthalic acid, citric acid, nitrilotriacetic acid, ethylenediaminetetraacetic acid, or mixtures of two or more thereof or a derivative of a polycarboxylic acid chosen from dimethyl malonate, diethyl malonate, dimethyl succinate, dimethyl glutarate, diethyl glutarate, dimethyl glutamate, diethylglutamate, dimethyl adipate, diethyl adipate, dimethyl terephthalate, succinic anhydride, maleic anhydride, glutarylchloride, adipoyl chloride, or mixtures of two or more thereof; with a polyamine chosen from polyalkylene polyamines, polyethylene polyamines, polypropylene polyamines, polybutylene polyamines, polypentylene polyamines, polyhexylene polyamines, or mixtures of two or more thereof, to form a polyamidoamine intermediate, wherein the molar ratio of the polyamine to the polycarboxylic acid or the derivative of the carboxylic acid is from about 0.9:1 to about 1.6:1;
   b. reacting a polyetheramine that comprises from 1 to 3 primary amine groups with an epihalohydrin chosen from an epifluorohydrin, epichlorohydrin, epibromohydrin, epiiodohydrin, or mixtures of two or more thereof, to form a polyetheramine-epihalohydrin intermediate having a molar ratio of polyetheramine to the epihalohydrin of from 0.5:1 to about 4.0:1;
   c. reacting the polyamidoamine intermediate with the polyetheramine-epihalohydrin intermediate to form a polyamidoamine polyetheramine-epihalohydrin resin having a dry weight ratio of polyetheramine-epihalohydrin intermediate to polyamidoamine of from about 0.07:1 to about 0.62:1;
   d. reacting the polyamidoamine polyetheramine-epihalohydrin resin with a difunctional cross-linker, wherein the dry weight ratio of difunctional crosslinker to polyamidoamine polyetheramine-epihalohydrin resin is from about 0.005:1 to about 0.2:1; and
   e. optionally adjusting the pH of the polyamidoamine polyetheramine-epihalohydrin resin with an acid to a value from about 2.0 to about 9.0.

2. The method of claim 1, wherein the polycarboxylic acid is an adipic acid.

3. The method of claim 1, wherein said polyamine is chosen from ethylenediamine, hexamethylenediamine, diethylenetriamine, triethylenetetramine, tetraethylenepentamine, dipropylenetriamine, bis-hexamethylenetriamine, N-methylbis(aminopropyl)amine, aminoethylpiperazine, bis-aminoethylpiperazine, piperazine ethylenediamine, tris (2-aminoethyl)amine, or mixtures of two or more thereof.

4. The method of claim 3, wherein the polyamine comprises a mixture of diethylenetriamine and triethylenetetramine.

5. The method of claim 4, wherein the polyetheramine comprises 2 primary amine groups and is characterized by the formula:
   a. $H_2N-(CH_3CHCH_2O)_x-(CH_2CH_2O)_y-(CH_2CHR)-NH_2$,
   b. wherein x is from 0 to about 40, y is from about 0 to about 40; and R is either H or $CH_3$.

6. The method of claim 4, wherein the polyetheramine comprises 2 primary amine groups and is characterized by the formula:
   a. 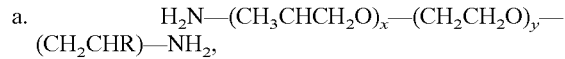
   H$_2$N—(CH$_3$CHCH$_2$O)$_x$—(CH$_2$CH$_2$O)$_y$—(CH$_2$CHR)—NH$_2$,
   b. wherein x is 6, y is about 39; and R is CH$_3$.

7. The method of claim 1, wherein the epihalohydrin comprises epichlorohydrin.

8. The method of claim 1, wherein the difunctional cross-linker is chosen from epifluorohydrin, epichlorohydrin, epibromohydrin, epiiodohydrin, ethylene glycol diglycidyl ether, 1,4-butanediol diglycidyl ether, glycidyl mesylate, glycidyl tosylate, or mixtures of two or more thereof.

9. The method of claim 8, wherein the difunctional cross-linker comprises epichlorohydrin.

10. The method of claim 1, wherein the acid is chosen from sulfuric acid, phosphoric acid, phosphorous acid, hypophosphorous acid, nitric acid, nitrous acid, hydrochloric acid, hydrobromic acid, hydroiodic acid, formic acid, acetic acid, propionic acid, butyric acid, citric acid, benzoic acid, or mixtures of two or more thereof.

11. The polyamidoamine polyetheramine-epihalohydrin resin according to claim 1.

12. A coating composition comprising the polyamidoamine polyetheramine-epihalohydrin resin of claim 1.

13. The coating composition of claim 12, further comprising a polyvinyl alcohol.

14. A crepe paper product comprising the coating composition of claim 12, wherein the crepe paper product is in the form of bath tissue, facial tissue, wipes, paper napkins, filter papers, or coffee filters.

15. The crepe paper product of claim 14, further comprising a polyvinyl alcohol.

* * * * *